Jan. 27, 1959          J. F. CRAINE          2,870,549
INTELLIGENCE TESTING APPARATUS
Filed Sept. 13, 1954          3 Sheets-Sheet 1
Fig. 1.
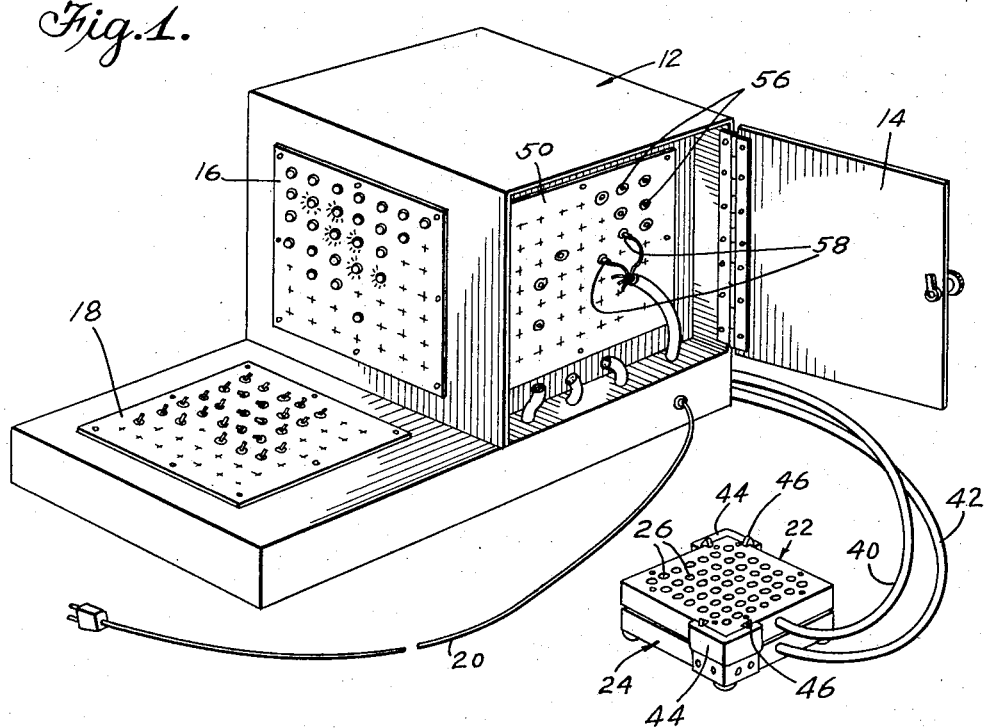
Fig. 8.
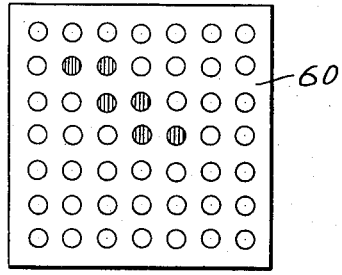
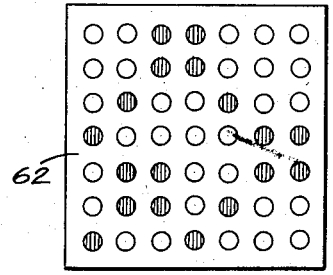
Fig. 9.
Fig. 10.
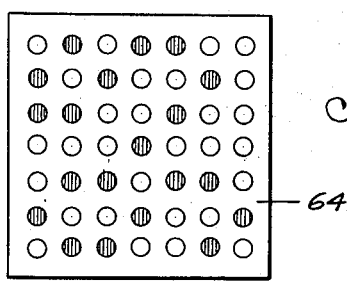
INVENTOR.
James F. Craine
BY
Albert J. Fihe
ATTORNEY Jan. 27, 1959 J. F. CRAINE 2,870,549
INTELLIGENCE TESTING APPARATUS
Filed Sept. 13, 1954 3 Sheets-Sheet 2

INVENTOR.
James F. Craine
BY Albert J. Fihe
ATTORNEY

United States Patent Office 2,870,549
Patented Jan. 27, 1959

2,870,549

INTELLIGENCE TESTING APPARATUS

James F. Craine, Beverly Hills, Calif.

Application September 13, 1954, Serial No. 455,535

1 Claim. (Cl. 35—22)

This invention relates to an intelligence testing apparatus and has for one of its principal objects the provision of an instrument designed specifically to test intellectual adaptability.

One of the important objects of the invention is to provide a device aimed primarily at tapping the higher level thought processes necessary to quickly arrive at the correct answers called for in the particular test situation as presented to the subject.

Another important object of the invention is the provision of a device wherein the subject taking the psychological test provided is continually forced to change his point of reference, whereby the test will provide a valid objective measure of the capacity of an individual to adapt himself to changing conditions when he is forced to rely upon his intellectual faculties alone.

Yet another object of the invention is to construct an apparatus and test which will enable certain predictions as to the probable success or failure of an individual in future situations of various types as encountered.

Another and still further important object of the invention is a purposeful departure from the usual intelligence or aptitude test which places an undue premium upon education per se and to provide a yardstick of true intelligence which is not necessarily a function of education but more of intellectual adaptability.

Other and further important objects of the invention will be apparent from the disclosures in the accompanying drawings and following specification.

The invention, in a preferred form, is illustrated in the drawings and hereinafter more fully described.

In the drawings:

Figure 1 is a perspective view of the intelligence testing apparatus of this invention showing a preferred form.

Figures 8, 9 and 10 illustrate typical test cards presenting various problems to the subject for solution.

As shown in the drawings:

Figure 2:
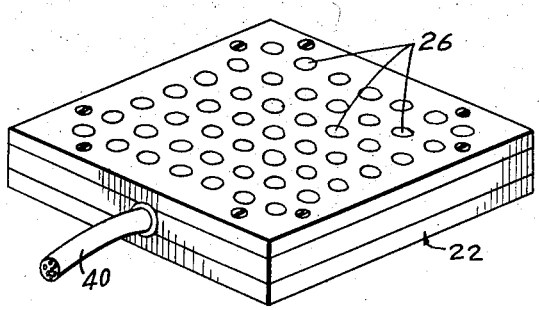
Figure 2 is an enlarged view of one portion of the master switch which enables the psychologist or other operator to quickly shift the sequence and relationship of certain visual parts of the device with respect to individual operating elements of the parts.

The reference numeral 12 indicates generally the case which contains the essential elements of the intelligence testing apparatus of this invention and which may have a hinged door 14 for selectively enclosing certain portions thereof.

A panel 16 is in the face of the case 12, this being provided with a plurality of light bulbs or the like, preferably forty-nine in number and arranged in a square with seven on a side. A corresponding operating panel 18 with manually operated switches is mounted on the base portion of the casing 12. A wire 20 leads to a source of electric power for the lights 16.

Current from any one of the switches in the panel 18 is carried to the corresponding light on the panel 16 through what is designated as a variable master switch formed in two main portions 22 and 24 as illustrated in Figure 1.

Figure 3:
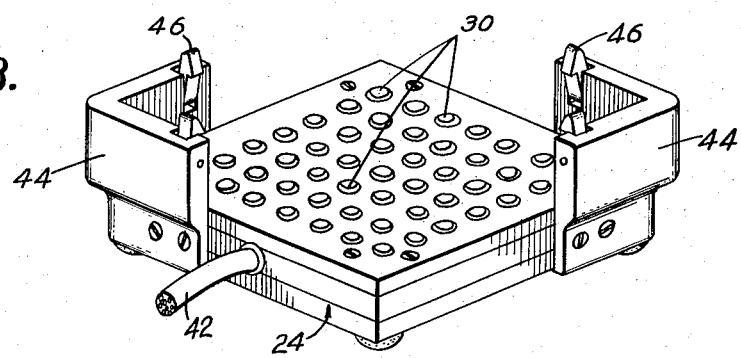
Figure 3 is a corresponding view of the other portion of the master switch just described.

These two main portions are shown in more detail in Figures 2 and 3 respectively, wherein the structure shown in Figure 2 is designated as the shiftable or top portion and the structure shown in Figure 3 is designated as the relatively fixed or base portion.

Figure 4:
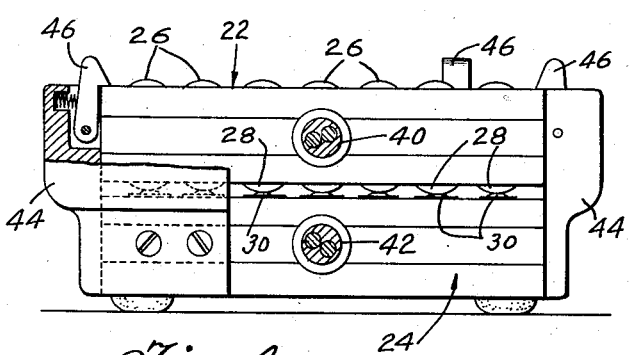
Figure 4 is a side elevation of the master switch in assembled operating condition, parts being in section and parts being broken away.
Figure 7:
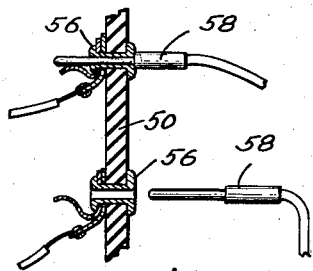
Figure 7 is an enlarged detail view illustrating two of the removable jack-plugs which can be employed to further vary the relationship of the associated operating and visual elements whereby additional conditions and sequences for solution may be presented to the subject.
Figure 5:
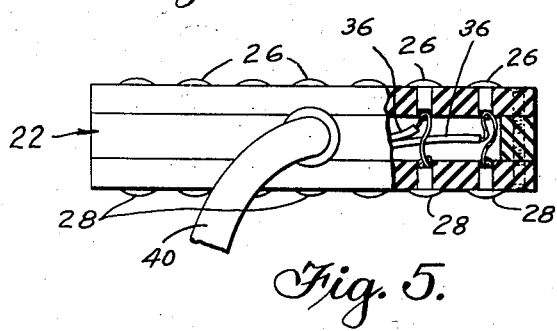
Figure 5 is a detail view showing a portion of the interior of the upper part of the master switch illustrated in Figure 2.
Figure 6:
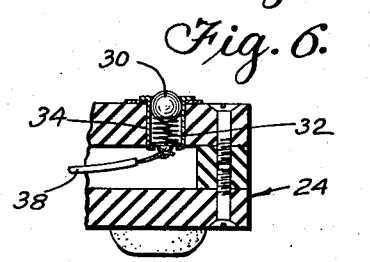
Figure 6 is a detail view of a portion of the interior of the lower part of the master switch shown in Figure 3.

The top portion 22 has a series of electric contact elements 26 in its upper face and another series of similar electric contact elements 28 in its lower face, as best shown in Figures 4 and 5. These are equal in number and spaced relationship. In the drawings, forty-nine such contacts are shown in a square, seven on a side, but the number may be varied and the arrangement changed in order to provide different situations as desired or considered necessary.

The contacts may be arranged in concentric circles or may be spaced in a hexagonal or other relationship so long as they match in any position with the corresponding contacts in the lower portion of the master switch 24.

These contact elements preferably comprise metal balls or the like 30 pressed into position by springs 32 in housings 34 formed in the upper face of the master switch element 24.

Individual wires 36 and 38 are connected to the respective contacts 26, 28 and 30 and these are preferably let into the master switch elements 22 and 24 by cables 40 and 42 respectively.

Corner plates 44 are mounted on the lower portion 24 of the master switch element and these are provided with spring pressed latches 46 which can be cammed outwardly to allow of a ready insertion of the upper portion 22 of the master switch element into the corner plates, and the latches then spring back into position, assuring of a positive flow of current between the matching contact elements 26 or 28 and 30 as the case may be. Retraction of the latches 46 enables a ready removal of the upper portion 22 of the master switch element whereby its relationship to the lower portion can be readily changed.

For example, when the two portions 22 and 24 are locked together with the cables 40 and 42 in alignment, operation of any one of the switches in the panel 18 will light the correspondingly placed bulb in the panel 16. However, the upper portion 22 of the master switch element may be rotated at angles of 90°, 180° or 270° with respect to the base portion, thereby presenting an entirely different problem of switch and light bulb combinations to the subject operating the device. Additionally, because of the double contacts 26 and 28 on the opposed faces of the master switch element 22, the same may be reversed, presenting four additional and completely different combinations so far as the switches and lights are concerned.

Additional and varied combinations can also be made by employing the plug and jack relationship on the switchboard 50. In this way, the combinations presented to the subject may be varied almost indefinitely, whereby problems of changed operating conditions testing the adaptability of the subject can be presented to a highly complicated degree.

Figure 11:
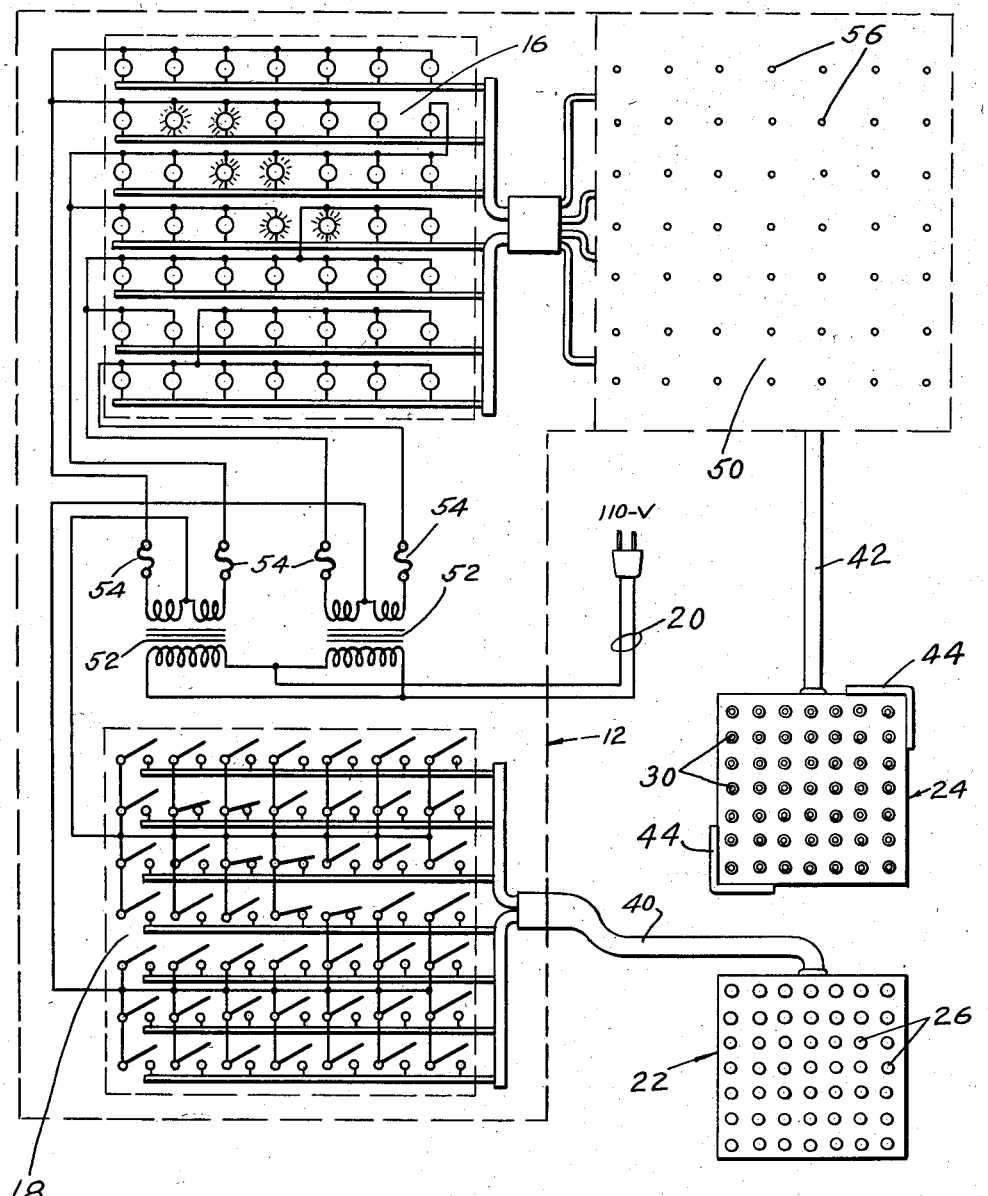
Figure 11 is a wiring diagram of the apparatus.

By referring to the wiring diagram of Figure 11, it will be noted that power for operation of the structure is brought in from an ordinary 110 volt line or similar source through the wires 20 and thence to transformers 52. In the case of forty-nine light bulbs as shown on the panel 16, four fuses 54 are provided, one connected with thirteen bulbs in parallel and the other three with sets of twelve bulbs in parallel. From the light bulb panel 16, individual wires are brought into the switchboard 50 containing the jacks 56 and the plugs 58, and thence to the master contact unit base 24 through the cable 42.

The upper or shiftable master switch contact unit is indicated at 22 in Figure 11, having its cable 40 carrying respective wires to individual switches mounted in the panel 18, and wires lead from there back to the transformers 52.

In operation, the subject is presented with a chart such as those illustrated in Figures 8, 9 and 10. These charts conform to the switch and light bulb relationship, and as shown, are square with forty-nine discs, some of which are left blank and some of which are colored to indicate the particular lights to be actuated by the operator when using the necessary switches. These can be made of varying degrees of simplicity or difficulty. The chart shown at 60 in Figure 8 indicates that six lights are to be operated and these are rather closely grouped in pairs, presenting a relatively simple problem. The chart 62 in Figure 9 requires more operations and obviously includes a more definite spacing arrangement. The chart 64 in Figure 10 is even more complicated, and an enormous number of variations can be made. Additionally, the charts themselves can be presented in four different positions to the subject.

Originally, the subject is requested to actuate lights by corresponding switches when the master control unit 22—24 is in normal position, as shown in Figure 1. This of course presents practically no difficulty, even to a person of low grade intelligence. However, a shifting or turning over of the upper portion 22 of the master control element will require a complete reorientation by the subject and another shift of the master control element will force the subject to again change his point of reference and begin all over again from a completely new starting point.

Obviously eight different combinations can be made by shifting the upper portion of the master contact unit and the psychologist or other operator can, by timing the reactions of the subject, arrive at a very definite measure of an individual's capacity to adapt to changing situations.

Greatly enlarged numbers of variations can be made by rearranging the plug and jack combinations in the panel 50. In addition to timing the reactions of the subject, the operator can also count the number of errors made in re-adjusting.

It will be evident that herein is provided an instrument which will give psychologists and others a reliable indication of the intelligence of an individual, especially at the higher levels. While in the same general category as the Block Design test and the Vigotsky Blocks test, both already well accepted as measures of intelligence, this goes well beyond either of those in terms of difficulty and should provide a more precise measure of the intelligence of a selected individual.

It can be used with great advantage by personnel directors, in executive departments of corporations, on pilots of test, fighter and passenger planes, and in many walks of life where predictions are essential so far as the reaction and behavior of a person in future situations are concerned.

It is already known that some people are much more flexible and adaptable than others and also that there is a wide range of differences along this continuum. It is also evident in general that the more readily an individual is capable of adapting to the many problems and different situations continually facing him, the more successful he is likely to be in life. This should apply as well in business as in marriage, in social contacts, in war, or in any other situation where problems are confronted and decisions are necessary.

By the use of the device of this invention, the psychlogist will readily recognize that the way a subject approaches this test, the way he reacts to the frustrating situation wherein he is continually forced to change his point of reference, will indicate many things about the subject as an individual. With this knowledge the psychologist will also be able to make predictions regarding the future reaction and behavior of the subject.

I am aware that many changes may be made and numerous details of construction varied throughout a wide range without departing from the principles of this invention, and I therefore do not propose limiting the patent granted hereon otherwise than as necessitated by the prior art. For example, the master contact unit or switch may be composed of any suitable insulating material such as wood, fiber, plastic or the like. The contacts themselves may comprise entirely different elements from those shown and described, and the manner of fitting the two elements together to produce variations in tests is capable of many and varied structures. Clamps may be employed for this purpose, either removable or fixed on one unit, and the release latches may be of different constructions.

Also, the switches may comprise push buttons or the like, or they may be colored on one side to indicate whether they are on or off. Such colors can include radiant or light reflecting pigments. Hinged plates can be substituted for the lights in the panel 16 or other devices adopted. Greater or smaller numbers of lights or the like and corresponding switches or the like, and in different conformations, may be used.

The upper or shiftable portion of the master switch or contact unit can be cubical, thereby providing six different combinations of connections between the switches and lights on its respective faces. These combinations can be in lines or groups similar to the varied combinations which can be produced by employing the jacks and plugs in the panel 50.

I claim as my invention:

An intelligence testing apparatus comprising a panel of lights or the like in a pre-determined relationship, a panel of corresponding operating switches or the like in a similar relationship, current-carrying means between the switches and lights, a master control switch in the current-carrying means for varying the relationship between the switches and lights, an additional relationship varying means included in the circuit, said additional means comprising a switchboard, having a number of jack-plugs corresponding to the number of switches and lights, the plugs and jacks being originally in a normal light operating relationship with respect to the switches, the master control switch being composed of two parts, each having respective contact elements, one element of the master control switch being relatively fixed and the other element being shiftable and variable with respect thereto, the shiftable and variable portion of the master control element being cubical.

References Cited in the file of this patent
UNITED STATES PATENTS

| | | |
|---|---|---|
| 1,564,138 | Rowland | Dec. 1, 1925 |
| 2,442,014 | Myers | May 25, 1948 |
| 2,518,458 | Friedman | Aug. 15, 1950 |
| 2,628,101 | Prentice | Feb. 10, 1953 |